Oct. 8, 1935.    L. L. DOLLINGER    2,016,991
AIR FILTER
Filed May 16, 1931    3 Sheets-Sheet 2
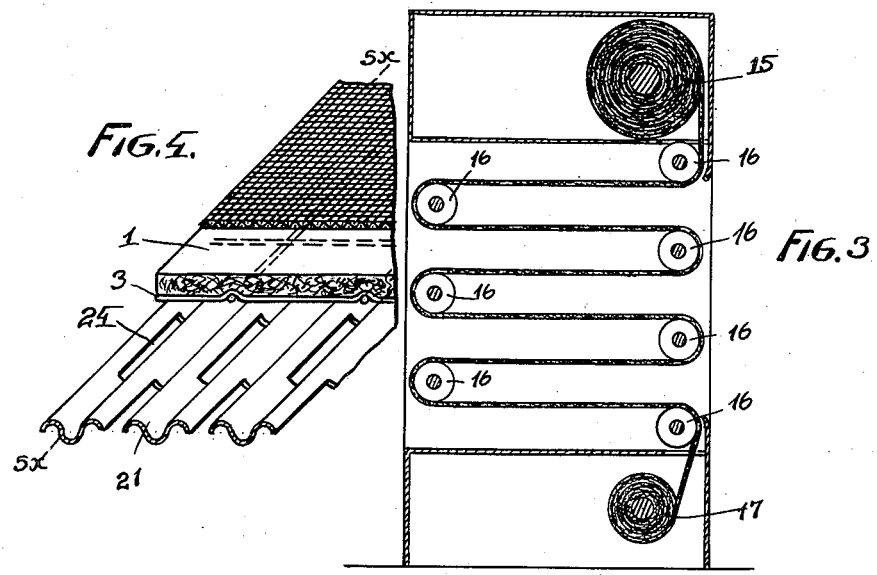
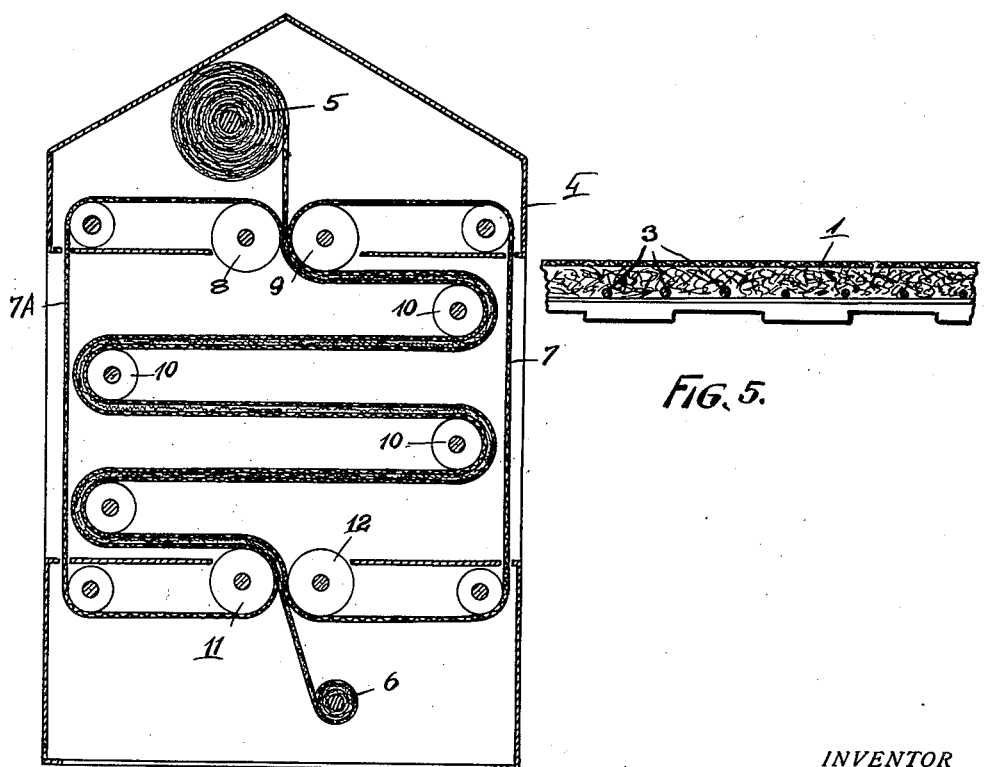
INVENTOR
LEWIS L. DOLLINGER
BY
ATTORNEY Oct. 8, 1935.  L. L. DOLLINGER  2,016,991

AIR FILTER

Filed May 16, 1931  3 Sheets—Sheet 3

INVENTOR
LEWIS L. DOLLINGER
BY
ATTORNEY

Patented Oct. 8, 1935

2,016,991

UNITED STATES PATENT OFFICE 2,016,991

AIR FILTER

Lewis L. Dollinger, Rochester, N. Y., assignor to Staynew Filter Corporation, Rochester, N. Y.

Application May 16, 1931, Serial No. 537,815

4 Claims. (Cl. 183—62)

This invention relates to air filters and has for its object to provide a cheap filtering medium of high filtering efficiency composed of extremely fine fibers of paper, cotton, wool, asbestos, etc. lightly held together to form a relatively thick filtering medium in a very loose or porous condition.

Another object of this invention is to provide this filtering medium with means for feeding it so that as a portion of the filtering medium becomes clogged and filled with foreign matter, another portion of the filtering medium may be fed in its place.

Another object of this invention is to provide feeding means by which the filtering medium may be continually replaced as the resistance of it increases.

Other objects and advantages will be apparent from the description of the invention, reference being had to the accompanying drawings in which Figure 1 is a vertical sectional view of one form of the air filtering apparatus.

Figure 2 is a vertical sectional view of a modified form of the air filtering apparatus.

Figure 3 is a vertical sectional view of a simplified form of the filtering apparatus.

Figure 4 is a detail perspective view of a portion of the filtering material, its support and means for feeding it as it is used in the air filter illustrated in Figure 6.

Figure 5 is a longitudinal sectional view of the filtering material, its support and feeding means illustrated in Figure 4, the section being taken on the line 5x—5x of Figure 4.

In the several figures of the drawings like reference numerals indicate like parts.

The type of air filter forming the subject matter of my present invention makes use of a relatively thick filtering medium made up of extremely fine fibers of all kinds, such as cotton, wool, paper, asbestos, etc. which are brought together in a very loose or porous condition and are formed into a continuous sheet and held together and fed in this form from a roll. Due to the fineness and thickness of the filtering medium thus formed an extremely high efficiency is secured by it which permits air to pass there thru at a maximum velocity and a minimum resistance. Besides being an efficient filtering medium it has also the advantage of being a very good silencing means for fan noises, a factor which is especially desirable in connection with school, auditorium, theatre and office building air filtering installations.

Figures 1, 1A:
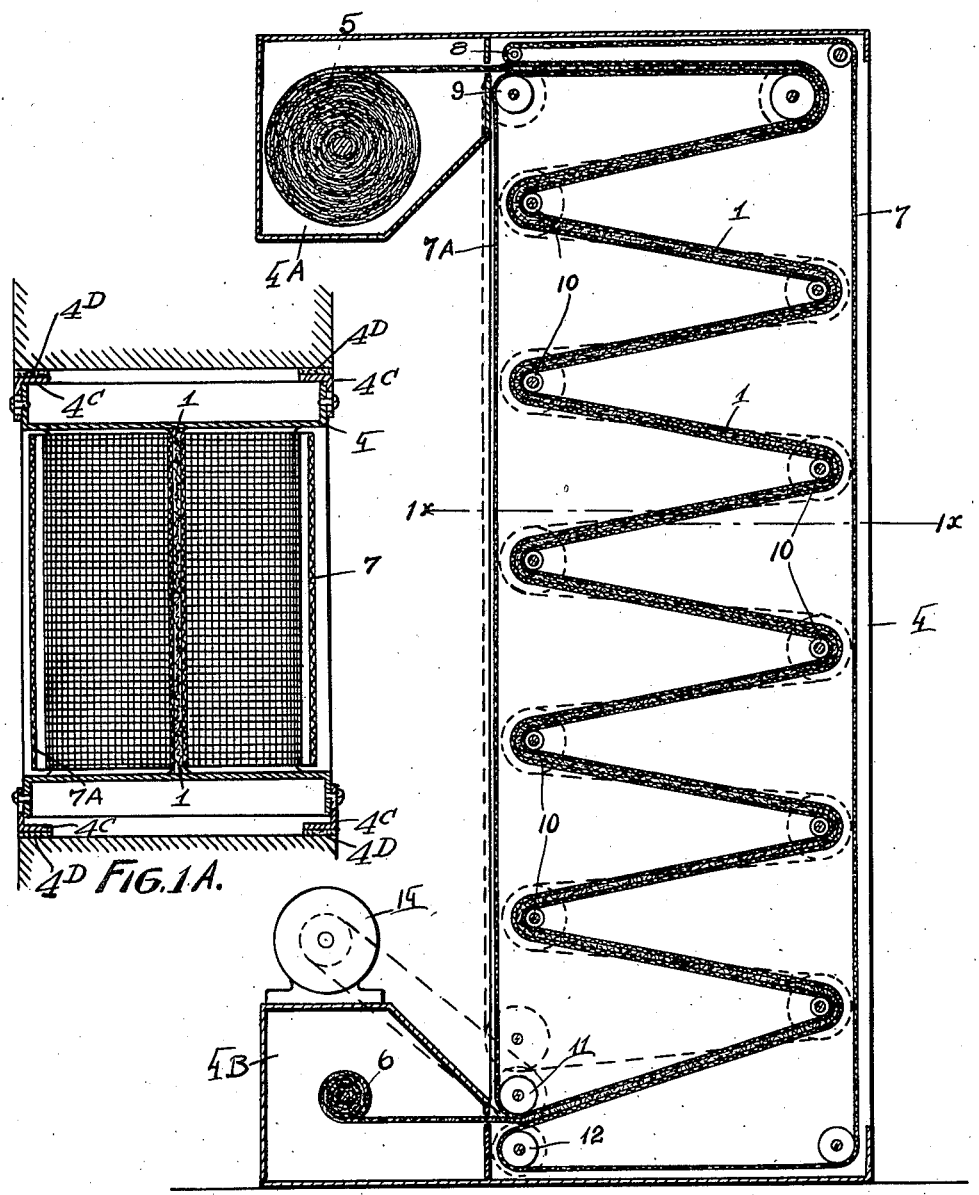
Figure 1A is a horizontal sectional view of the filtering apparatus, the section being taken on the line 1x—1x of Figure 1.

In Figure 1 I have diagrammatically illustrated the preferred form of the filtering apparatus which comprises a suitable casing 4 having an overhanging compartment 4A at the top and a similar compartment 4B at the bottom on one side thereof. In the top compartment 4A is mounted the roll 5 of the filtering medium from which the filtering medium is unrolled in a continuous sheet by means of a pair of endless screen belts 7 and 7A. These belts are supported to move closely toward each other at the top of the apparatus between the rollers 8 and 9 and are spaced to grip the filtering sheet 1 between them at this point. The belts and filtering sheet together then pass in a zig zag path over a series of rollers 10, 10 until they reach the pair of rollers 11 and 12 at the bottom of the apparatus. At this point the screen belts separate and are guided to their starting position, one in front of the combined screen belts and filtering medium and the other at the back thereof. At the point where the screen belts separate, the filtering medium, which during its travel between the screen belts has absorbed the foreign matter separated from the air, passes onto a roller 6 where it is wound up or left to accumulate as fast as the clean filtering medium is unwound from the supply roll 5. The rollers supporting the feed belts 7 and 7A during their travel both separately and in unison with the filtering medium, are rotated by a suitable sprocket gear and chain drive or by worm and gear which in turn is driven by the electric motor 14 or other motive power.

The width of the filtering sheet is slightly greater than the width of the casing 4 thru which it is fed and for this reason both edges of the filtering sheet turn up against the walls of the casing as illustrated in Figure 1A and thus form a substantially air tight joint between the edges of the filtering sheet and the walls of the casing.

In order to provide an air tight joint between successive filtering units or between the walls of an opening and the filtering unit which is mounted in it, the sides of the casing 4 are provided with the angular uprights 4C which have a limited lateral movement thereon. These uprights carry a packing strip 4D along the outer edge which provides a tight seal between the casing and the adjacent walls when the uprights are laterally adjusted on the casing to hold the packing strip in contact with the wall.

The fact that the compartments 4A and 4B are either in front or in back of the casing 4 of the apparatus enables the full head room and the full width of the space available to be utilized and makes it possible for the automatic filtering apparatus to occupy a minimum space which is not much greater than the space which a non-automatic filter would occupy.

In Figure 3 I have illustrated the simplest form of filtering mechanism in which a continuous sheet of suitably reinforced filtering material may be used. The filtering sheet in this instance is mounted in the top of the filtering mechanism in the form of a roll 15 and as in the mechanism illustrated in Figure 1 is fed from this roll and passed in a sinuous path over the rollers 16, 16 to a roller 17 in the bottom of the filtering mechanism on which it is automatically rolled up as fast as it is unwound and fed from the roll in the top of the filtering mechanism or is left to accumulate in the bottom compartment. The casing surrounding the mechanism is open in front and back of the sinuously extending sheet of filtering material so that the air can pass thru the filtering sheet from one side to the other and be filtered thereby. As the foreign matter filtered from the air passing thru the filter fills the interstices between the fibers of the sheet, the sheet is fed from the upper roll to the lower to replace the clogged up portion of the sheet with new and clean portions of the sheet. This may be done by rotating one or all of the rolls 16, 16 and the roll 17 by hand or by power and by regulating this movement in accordance with the pressure drop thru the filter.

In Figure 2 I have illustrated a modified form of the filtering mechanism which is very similar to that illustrated in Figure 1, except that the casing of the apparatus is modified so that the supply roller 5 is located in the top of the casing and the roller 6 in the bottom of the casing. In this form the filtering sheet 1 is fed from the roll and moved thru a sinuous path by a pair of endless screen belts 7 and 7A. These belts are supported so as to move toward each other at the top between the rollers 8 and 9 and grip the filtering sheet between them. The belts and filtering sheet then pass in unison over a series of rollers 10, 10 until they reach a second pair of rollers 11 and 12 at the bottom of the mechanism where the belts separate and move in opposite directions leaving the filtering sheet 1 free to be rolled up on the roller 6. The belts 7 and 7A continue on to the top of the mechanism over the rollers 8 and 9 respectively to keep on feeding the filtering sheet from the roller 5 to the roller 6. Suitable driving means (not shown) rotate some or all of the rollers to feed the filtering sheet at the desired rate of speed either continually or intermittently. As in the filter illustrated in Figure 1, the casing of the filter illustrated in Figure 2 is open in front and back of the sinuous portion of the filtering sheet so that air passing thru the casing is filtered by the filtering sheet.

Figure 6:
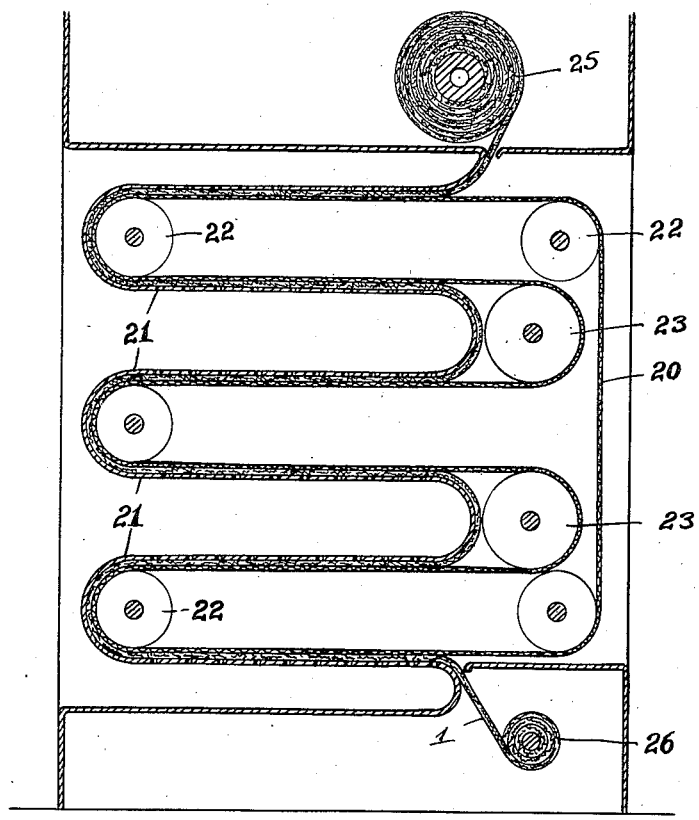
Figure 6 is a vertical sectional view of another modified form of the air filtering apparatus.

In the filtering mechanism illustrated in Figure 6 but one screen belt 20 is used for feeding the filtering sheet. This belt is however supplemented by a supporting partition 21 which extends the full length of the sinuous path of the filtering sheet. The endless screen belt 20 travels over the rollers 22, 22 which are spaced and arranged so that it makes contact with the filtering sheet on one side so as to hold it against the sinuous partition 21. In this way the endless belt is in contact with the filtering sheet the full length thereof except where the sheet changes its course at one end of the sinuous path. At this point the belt leaves the sheet and travels over a roller 23 but makes contact with the filtering sheet again soon after it leaves this roller. In this way the pressure of the belt on the filtering sheet is eliminated at the bend where it would cause a compression of the filtering material.

The sinuous partition 21 of course must be perforated in order to allow air to pass thru the filtering sheet. These perforations may be provided in any suitable manner but the manner in which they are provided as illustrated in Figures 4 and 5 has certain advantages. In the first place the partition is shown corrugated so as to reduce the frictional contact between the filtering sheet and the partition to a minimum. The perforations 24 in this corrugated partition are provided in the bottom of the corrugations and are staggered with relation to each other so as not to weaken the supporting strength too much. The fact that the perforations are in the bottom of the corrugations makes it possible for the filtering sheet to slide over the partition without coming in contact with the edges of the perforations and this prevents the pulling out of some of the fibers by the edges of the perforations. This is further helped by the addition of suitable reinforcing which keep the filtering sheet from sinking into the corrugations as it slides over it.

As illustrated in Figure 6 the filtering sheet is fed from the roller 25 in the top of the casing and is wound up on the roller 26 in the bottom of the casing. As in the filters described above, a suitable driving mechanism (not shown) is used to drive the belt 20 to feed the filtering sheet either continuously or intermittently at the desired rate of speed.

Figure 7:
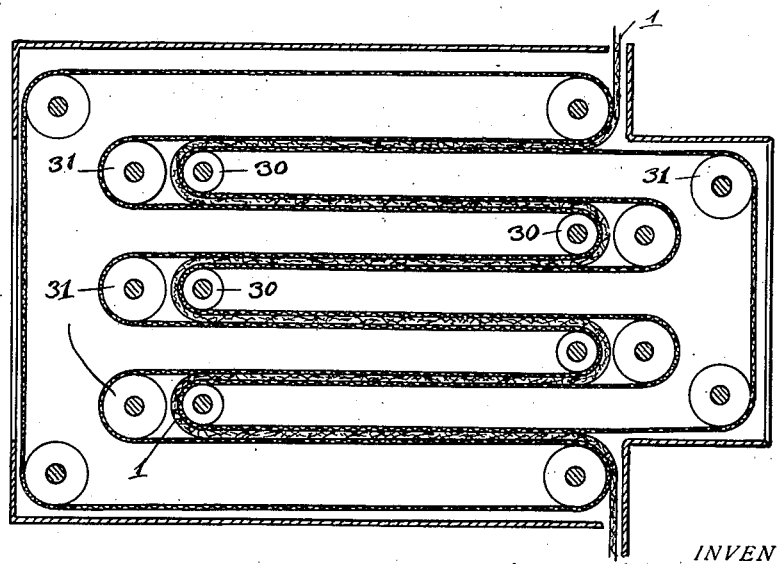
Figure 7 is a vertical sectional view of another modified form of the air filtering apparatus.

In the modified form of the filtering mechanism illustrated in Figure 7, the filtering sheet is fed between two endless belts in a manner similar to that illustrated in Figures 1 and 2. The difference between the mechanism illustrated in Figure 2 and that illustrated in Figure 7 is in the addition and arrangement of additional supporting rollers. In this form of the mechanism separate rollers 30, 30 are provided to support only the ends of the horizontal sections of the filtering sheet while the transmission belts are alternately supported by the rollers 30 and 31. In this way the transmission belts are separated from the filtering sheet at the points where the filtering sheet changes its course and this avoids compression of the filtering sheet between the transmission belts and the filtering sheet at these points.

I claim:

1. In a filtering mechanism the combination of a casing having an inlet and an outlet opening, a roll of filtering medium, an endless feed belt adapted to make contact with said filtering medium and roll means adapted to feed the filtering medium from the roll and support said filtering medium and endless belt in a sinuous path between said inlet and outlet openings of said casing.

2. In a filtering mechanism the combination of a casing having an inlet and an outlet, an endless feed belt, a filtering medium fed to contact said endless belt above the inlet and outlet of said casing and means for moving said endless belt with said filtering medium in a sinuous path within said casing and permit the air to pass thru said filtering medium in its passage thru said casing from the inlet to the outlet thereof said filtering medium being separated from said endless belt below said inlet and outlet of said casing.

3. In a filtering mechanism the combination of a casing having an inlet and an outlet, an endless feed belt, a filtering medium carried by said endless belt and means for moving said endless belt with said filtering medium in a sinuous path from the top to the bottom of said casing to form substantially horizontal filtering pockets between the walls of said casing said means also moving said endless belt from the bottom to the top of said casing behind said filtering pockets.

4. In a filtering mechanism the combination of a casing having an inlet and an outlet opening, a roll of sheet filtering medium, means moving into and out of contact with both sides of said filtering medium for supporting and feeding said filtering medium within said casing between the inlet and outlet openings and roll means for supporting and moving said first mentioned means.

LEWIS L. DOLLINGER.